United States Patent [19]

Wright et al.

[11] 4,417,308

[45] Nov. 22, 1983

[54] DUAL INNER LOOP FAULT INHIBIT OF AIRCRAFT OUTER LOOP

[75] Inventors: Stuart C. Wright, Milford; Don L. Adams, Fairfield; William C. Fischer, Monroe; David J. Verzella, Guilford, all of Conn.

[73] Assignee: United Technologies Corporation, Hartford, Conn.

[21] Appl. No.: 249,274

[22] Filed: Mar. 30, 1981

[51] Int. Cl.³ .................... G06F 15/50; G06G 7/70
[52] U.S. Cl. ................. 364/434; 244/17.13; 244/177; 244/194
[58] Field of Search .......... 364/434; 244/17.13, 244/177, 178, 179, 194, 196, 197

[56] References Cited

U.S. PATENT DOCUMENTS

| | | | |
|---|---|---|---|
| 4,004,756 | 1/1977 | Gerstine et al. | 244/17.13 |
| 4,029,271 | 6/1977 | Murphy et al. | 244/17.13 |
| 4,078,750 | 3/1978 | Tomlinson | 244/194 |
| 4,109,886 | 8/1978 | Tribken et al. | 244/178 |
| 4,213,584 | 7/1980 | Tefft et al. | 244/17.13 |
| 4,279,391 | 7/1981 | Adams et al. | 244/17.13 |

Primary Examiner—Jerry Smith
Attorney, Agent, or Firm—M. P. Williams

[57] ABSTRACT

In an automatic flight control system, failure of dual inner loop actuators (12, 13) to track position (22, 23) within a permissible tolerance (182) of each other will cause automatic shut down (185, 190) of an outer loop actuator (37) which is responsive (61) to the same proportional signals (54, 55) as are the inner loop actuators. The invention is disclosed in a system in which automatic flight control positioning of the control surfaces of the aircraft is through a fast, limited authority inner loop, the authority of which is centered by repositioning of the outer loop.

2 Claims, 5 Drawing Figures

DUAL INNER LOOP FAULT INHIBIT OF AIRCRAFT OUTER LOOP

DESCRIPTION

1. Technical Field

This invention relates to aircraft flight control systems, and more particularly to aircraft flight control systems having dual, fast, limited authority, inner stability loops provided with the same proportional inputs as a slow, full authority, outer loop of the system.

2. Background Art

A traditional form of aircraft automatic flight control system includes two major subsystems for each control axis of the aircraft (such as roll, or yaw). One of these subsystems is frequently called the outer loop since it actually moves the pilot control in the same fashion as if the pilot were moving it, and it does so in a manner which is perfectly visible to the pilot. The outer loop has full pilot authority to control the particular axis involved, but is limited in the rate at which it can exercise the authority, so as to prevent instantaneous hard-over situations. The rate limiting of the outer loop will normally provide the pilot an indication that something is wrong, and allow him to provide countermanding inputs through his control mechanisms (stick or pedals, as the case may be). The outer loop of an automatic flight control system may be thought of as providing typical autopilot functions, such as airspeed hold, pitch and roll attitude hold, heading hold and altitude hold.

As an example, the cyclic pitch stick of a helicopter controls lateral cyclic pitch of the main rotor blades by right and left motion, thereby to control the roll attitude of the helicopter, and controls longitudinal cyclic pitch of the main rotor blades by fore and aft motions, thereby to control the pitch attitude of the helicopter. The pitch outer loop channel actually drives the cyclic pitch stick fore and aft so that, unless the pilot applies force against a resilient connection mechanism to overcome the outer loop, the cyclic pitch stick fore/aft position will be the same as that dictated by the cyclic pitch outer loop actuator of the automatic flight control system.

The inner loop is provided in a manner that it adds or subtracts actual aircraft attitude commands from the basic commands provided by the outer loop. Typically, a high speed, limited authority (on the other of ±10% of pilot authority) actuator is connected in series with the outer loop mechanisms so that the actual aerodynamic surface position commands made to the aircraft (such as to the cyclic pitch swash plate-controlling mixer of a helicopter) differs by as much as 10% from that established by the outer loop (either the outer loop actuator or the pilot positioning of the stick). Stated alternatively, the action of the inner loop is centered about the outer loop. The system is arranged so that the inner loop does not reposition the outer loop; the action of the inner loop is therefore not reflected in the control stick (or pedals) and is therefore invisible to the pilot. In order to provide short term stability, the inner loop is typically fed information from inertial sensors which relate to the rate of change of the axis-controlling parameter (such as roll rate in the roll inner loop and yaw rate in the yaw inner loop). In contrast, the outer loop is typically fed with information from inertial sensors relating to the parameter involved (such as the vertical gyro pitch axis output and airspeed in the pitch outer loop, and directional gyro in the yaw outer loop).

An automatic flight control system which employs a fast, limited authority inner loop to provide positioning commands to the control surfaces of the aircraft, and a slow, full authority outer loop to recenter the authority of the inner loop, is described and claimed in a commonly owned, copending U.S. patent application entitled Automatic Outer Loop Centering of Aircraft Inner Loop, Ser. No. 249,299, filed Mar. 30, 1981 by Verzella et al.

In many automatic flight control systems, the inner, stability loop is frequently duplicated so as to operate in an "on/on" fashion. Should either system lock up or undergo a hard over-situation, driving to one of its stops, the other system will continue to provide inputs (up to the limit of its authority) which tends to retain the desired stability control (although not completely). When a system of the type described in the aforementioned Verzella et al application includes duplex, on/on inner stability loops, the proportional, long term flight path inputs are applied both to the inner loops and to the outer loop. In the case of one of the inner loops having failed, the actual aircraft response will begin to lag the desired response, providing additional proportional inputs. These will be applied to the outer loop as well as to the good remaining inner loop. Stated simply, this is equivalent to the outer loop tracking the failed actuator. A similar situation can exist in any automatic flight control system having a dual, on/on inner stability loop which receives significant components of proportional, long term flight path control inputs along with the outer loop.

DISCLOSURE OF THE INVENTION

Objects of the invention include provision of an aircraft automatic flight control system employing dual, on/on inner stability loops which receive proportional, long term flight path control input signals which are also applied to a long term full authority outer loop of the system, without the outer loop tracking failures in the inner loop.

According to the present invention, in an aircraft automatic flight control system, the position of each of a pair of high speed inner stability loop actuators, operating in an on/on fashion, are compared, and when the two actuators fail to track reasonably close to each other, the outer loop of the automatic flight control system is automatically shut down.

The invention avoids outer loop tracking of a failed actuator in an automatic flight control system having long term components applied to a dual, on/on inner stability loop as well as to an outer loop. The invention is particularly well suited for utilization in a case in which the dual inner stability loop system is employed for providing all automatic flight control system inputs to the control surfaces of the aircraft, whereas the outer loop provides only recentering of the authority of the inner loop systems.

The invention may be implemented utilizing analog, digital or computerized signal processing, with apparatus and techniques which are well within the skill of the art in the light of the teachings which follow hereinafter.

The foregoing and other objects, features and advantages of the present invention will become more apparent in the light of the following detail description of exemplary embodiments thereof, as illustrated in the accompanying drawings.

BEST MODE FOR CARRYING OUT THE INVENTION

Figure 1:
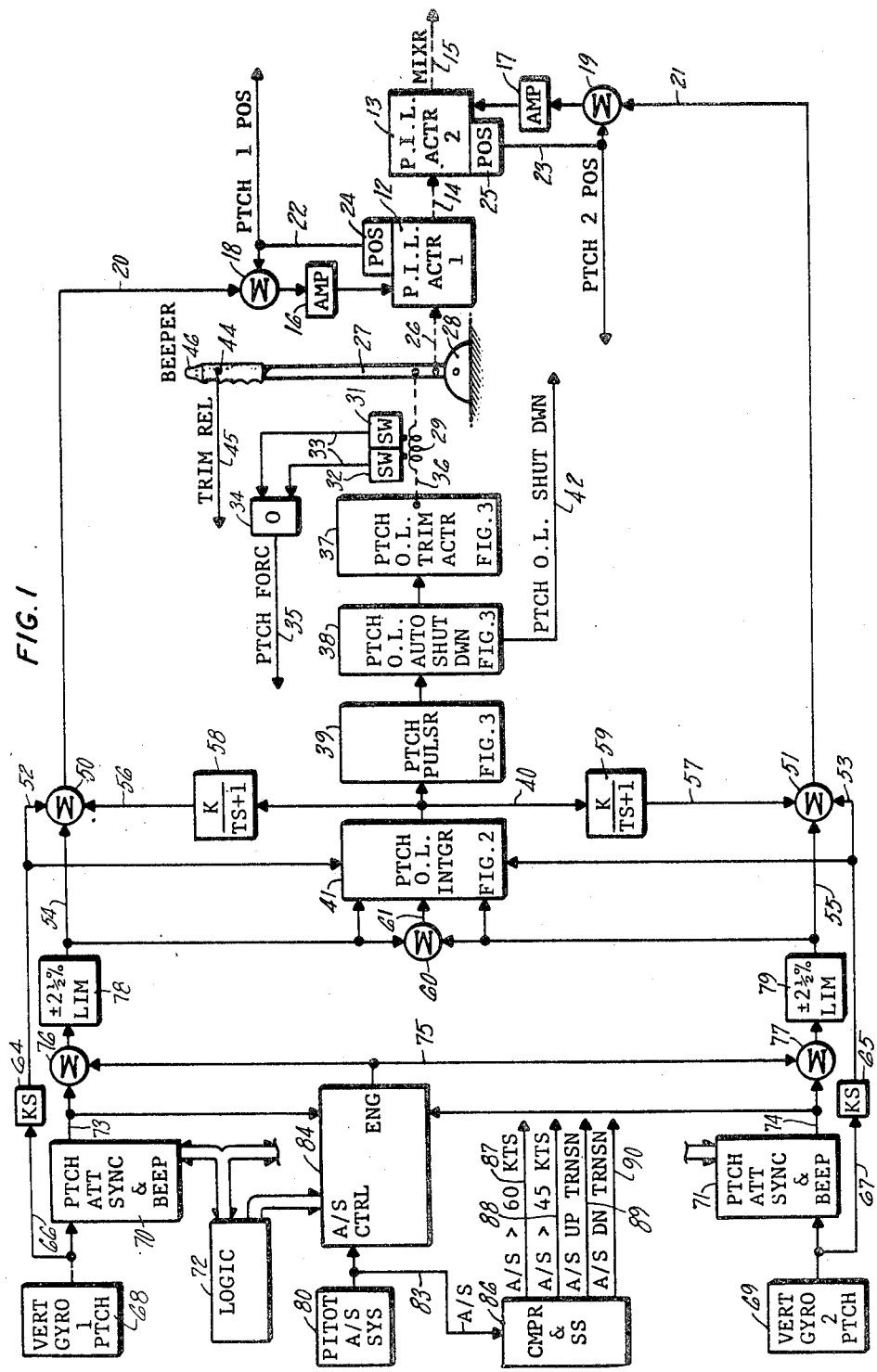
FIG. 1 is a simplified schematic block diagram of the longitudinal cyclic pitch channel of an automatic flight control system in which the present invention ma be implemented.

Referring now to FIG. 1, a helicopter longitudinal cyclic pitch control system for controlling the pitch axis attitude of a helicopter, within which the present invention may suitably be implemented includes a pair of inner loop longitudinal cyclic pitch actuators 12, 13 which are connected together by suitable linkage 14 and to a main rotor blade pitch angle swash plate mixer (not shown) by suitable linkage 15. Each of the actuators is driven by a corresponding amplifier 16, 17 in a nulling servo loop fashion. The amplifiers respond to error signals from corresponding summing junctions 18, 19 which provide the amplifiers with a signal indicative of the difference between a pitch command signal on a related line 20, 21 and a signal provided on a related line 22, 23 by a corresponding actuator position sensor 24, 25 which is indicative of the achieved position of the actuator. When the actuators 12, 13 have achieved positions corresponding to the signals on the lines 20, 21 the error signal provided by the summing junctions 18, 19 to the amplifier 16, 17 goes to zero, so the actuators will remain at rest until the signals on the lines 20, 21 are changed (or drift showing up in the lines 22, 23).

The actuators 12, 13 are also connected by mechanical linkage 26 to a cyclic pitch control stick 27 which is pivoted within a gimbal 28 for forward and aft motion against the operation of a trim position spring 29. A pair of switches 31, 32 are disposed on the actuator 37 for detecting motion of the stick 27 against the spring 29 in respective directions. Closure of either switch 31, 32 will provide a signal on a corresponding one of two lines 33 to cause an OR circuit 34 to provide a pitch force signal on a line 35. In various embodiments, the OR function provided by the circuit 34 may simply be implemented by the relationship of the switches 31, 32, as is shown in the art.

The cyclic pitch stick 27 is connected by mechanical linkage 36 and the spring 29 to a pitch outer loop trim actuator 37 which is driven through pitch automatic shutdown circuits 38 and pitch pulser circuits 39 by a signal on a line 40 provided by a pitch outer loop integrator circuit 41. These circuits serve to reposition the cyclic pitch stick 27 to a position indicative of the actual commands being provided to the linkage 15 as a consequence of motion of the actuators 12, 13. The pitch auto shutdown circuit 38 provides a pitch outer loop shutdown signal on a line 42. The cyclic pitch stick 27 has a switch 44 that can be closed by a thumb or finger so as to provide a trim release signal on a line 45. The stick 27 also has a "coolee hat" type of four-axis beeper switch 46 that can be moved forward or aft (or right or left) to provide beep signals; in a system of the type described, the beep signals are signals which provide small changes in the attitude reference signals.

The attitude command signals on the lines 20, 21 are each provided by a corresponding summing junction 50, 51, which sum together corresponding pitch rate signals on lines 52, 53, pitch attitude and A/S control signals on lines 54, 55 and outer loop compensation signals on lines 56, 57. The outer loop compensation signals are provided by lag amplifiers 58, 59 which are driven by the output of the pitch outer loop integrator on the line 40.

The signals on the lines 52-55 are applied to the pitch outer loop integrator 41 in order to detect high pitch attitude demand changes. The pitch attitude signals on the lines 54 and 55 are applied to a summing junction 60, the output of which is applied to the pitch outer loop integrator 41 on a line 61.

The signals on the lines 52, 53 are provided by differentiators 64, 65 from gyro pitch signals on lines 66, 67 which are provided by the pitch axis outputs of corresponding vertical gyros 68, 69. The signals on the lines 66, 67 are also compared with attitude reference signals in pitch attitude synchronizing and beep circuitry 70, 71. When the circuits 70, 71 are synchronized, the reference follows (is made equal to) the signal on the corresponding lines 66, 67 indicative of actual pitch angle of the helicopter; when beeping is employed, the reference is forced to equal a greater or lesser pitch angle; when the circuits 70, 71 are not synchronized, they provide pitch error signals on related lines 73, 74 indicative of the variance between the actual pitch angle of the helicopter and the reference helicopter pitch attitude. Logic circuits 72 are connected with the pitch attitude synch and beep circuits 70, 71 to control the operation thereof. In systems of the type disclosed herein, the signals on the lines 73, 74 are summed with a signal on a line 75 in corresponding summing junctions 76, 77, the resultant of which is applied to a related limiter circuit 78, 79 so as to provide the pitch attitude and airspeed control signals on the lines 54, 55 limited to 2½% of total pilot authority. Thus, the short term automatic attitude control which can be provided by means of the actuators 12, 13 is limited to ±5% (total, 10%) of total pilot authority.

A pitot-static airspeed system 80, of any suitable well known type, provides an airspeed signal on a line 83 to airspeed control circuits 84. The airspeed control circuit 84 may also respond to the pitch attitude error signals on the lines 73, 74 so as to provide, over the line 75, increased gain in attitude control when the airspeed control circuitry 84 is engaged. The airspeed signal on the line 83 might be utilized in circuitry 86, which includes compare circuits and single shot circuits (monostable multi-vibrators), or other signal transition detecting circuits, to provide signals on a plurality of lines 87-90 indicative of airspeed being greater than 60 knots or 45 knots, or transitions from below 40 knots to above 40 knots, and transitions from above 45 knots to below 45 knots, respectively. This circuitry may be of the type disclosed in U.S. patent application of Celelford et al, Ser. No. 176,832, filed on Aug. 8, 1980, or may be of other types of hardware or software.

The airspeed control circuits 84 and logic circuits 72 are described in detail in a commonly owned copending U.S. Patent Application entitled Retaining Airspeed Hold Engagement, Ser. No. 249,268, filed Mar. 30, 1981 by Adams et al.

Figure 2:
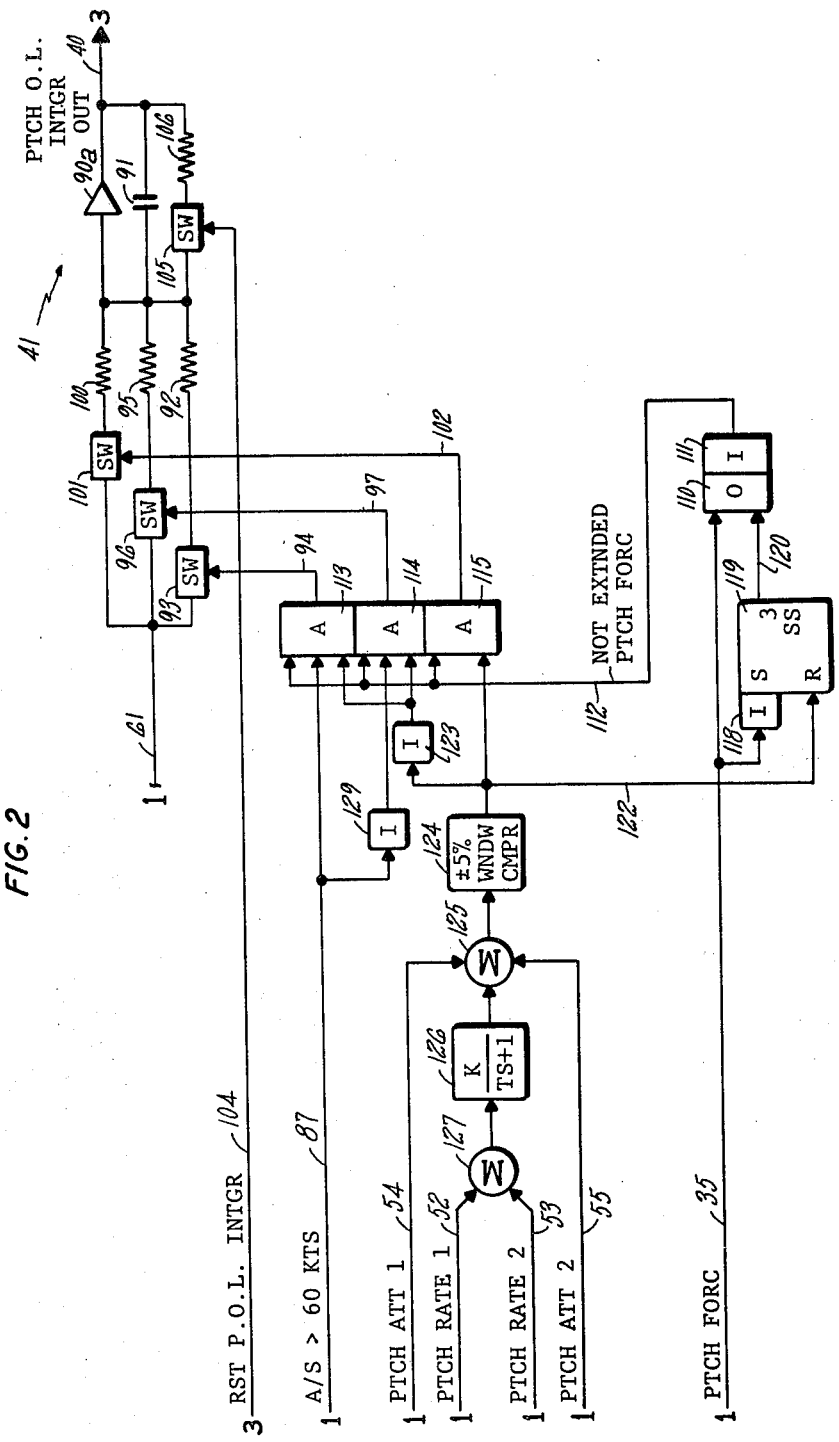
FIG. 2 is a simplified schematic block diagram of a pitch outer loop integrator and control circuits therefor, for use in the system of FIG. 1.

The pitch outer loop integrator 41 is illustrated in detail in FIG. 2. The pitch outer loop integrator 41 comprises an amplifier 90 a with a feedback capacitor 91 which forms an integrator, having an effective time constant is dependence upon the value of input resistance connected thereto. In the general case, a first resistor 92 is connected between the output of the summing junction 60 (FIG. 1) on a line 61 and the input of the integrator 41 by a switch 93 which is operated by a signal on a line 94 in response to the airspeed being greater than 60 knots. A second resistor 95 is connected by operation of a switch 96 in response to a signal on a line 97 when the airspeed is less than 60 knots. The resistor 95 may be somewhat less than the resistor 92 so as to provide a faster effective time constant of the integrator 41 at airspeeds above 60 knots than at airspeeds below 60 knots. This allows the outer loop to track somewhat more quickly (in a manner described hereinafter) at higher airspeeds than at lower airspeeds. And, a resistor 100 which is an order of magnitude lower than the resistors 92, 95 may be connected by a switch 101 in response to a signal 102 indicative of a high demand (rapid change in pitch attitude) condition. The integrator 41 is normally reset: for each step-wise movement of the pitch outer loop trim actuator 37; whenever the aircraft is on the ground; during trim release; and whenever the pitch outer loop channel is shut down; all as is described more fully with respect to FIG. 3 hereinafter. The reset function is in response to a reset pitch outer loop integrator signal on a line 104 which causes a switch 105 to place a moderately small resistor 106 in parallel with the capacitor 91 so as to cause it to discharge fully in about 10 milliseconds.

Whenever the pilot provides an input (that is, sufficient force to cause one of the switches 31, 32 to close) and thereby provides the pitch force signal on the line 35, the input to the pitch outer loop integrator 41 is opened so that the integrator holds its present value. This is achieved by providing the pitch force signal on the line 35 to an OR circuit 110 which operates an inverter 111 thereby removing an enabling signal on a line 112 which is applied to a plurality of AND circuits 113–115 so that all of the switches 93, 96, 101 are open. And, whenever the pitch force signal disappears from the line 35, an inverter 118 activates the set input of a 3 second resettable single shot 119 so as to provide a 3 second pulse on a line 120 to the OR circuit 110 so as to continue to inhibit the signal on the line 112 by means of the inverter 111 for an additional 3 seconds. But, if a high demand condition exists, as indicated by a signal on a line 122, the single shot 119 is immediately reset so that the enabling signal on the line 112 can appear immediately. The high demand signal on the line 122 is provided to the AND circuit 115 and through an inverter 123 to the AND circuits 113, 114, thereby to ensure that the switch 101 will be closed and the switches 93 and 96 will be open during periods of high demand. The high demand signal on the line 122 is generated by a window comparator 124 which has reference voltages therein equivalent to +5% and −5% of full pilot authority. The comparator 124 is fed by a summing junction 125 which sums the pitch attitude signals on the lines 54 and 55 with the output of a lag amplifier 126. The lag amplifier 126 is responsive to the output of a summing junction 127 that provides a signal as the summation of the pitch rate signals on the lines 52, 53. Thus, when the limited pitch attitude error and pitch rate of both channels exceeds 5% of pilot authority, a high demand condition is sensed that allows the pitch outer loop integrator to have a lower time constant so that it will (in a manner described with respect to FIG. 3) step the pitch outer loop trim actuator 37 at a faster rate to follow the high demand. For instance, when a pilot desires to make an altitude change and adjusts the collective pitch stick, the coupling (principally aerodynamic) between the collective pitch and pitch attitude axes of the aircraft causes significant pitch attitude changes; for instance, an increase in collective pitch causes the helicopter to nose up rapidly. In this situation, the pitch rate (increasing negatively) is in the same phase with the attitude (negative) and serves to speed up the process of getting into the high demand mode. The faster time constant created by the high demand signal on the line 122 causes inputs on the line 61 to be integrated more quickly. This is equivalent to having airspeed and attitude command signals on the line 61 which are higher than they actually are. The pitch rate signals are, however, principally provided in order to avoid "tuck over" situations when coming out of turns. When in a turn, the pilot pulls the nose up (aft, minus) to maintain altitude. When coming out of the turn and resuming a "wings level" situation, the pilot pushes the nose down (forward, plus) and then lets go of the stick. The pitch attitude, while still positive, is decreasing at a high rate as the helicopter returns to the pitch trim attitude corresponding to the position of the stick. This is an aerodynamically self-correcting situation which will automatically alleviate in a very short time if left alone. Because the rate of pitch attitude command (decreasing) is opposite to the pitch attitude command (positive) at this point of the maneuver, and because the rate of pitch attitude command is likely to be high even though the pitch attitude command is relatively low, the rate of signals could be high enough to overcome the command signals and still have a sufficient magnitude to trigger the comparator 124 and institute the high demand mode. This causes fast integration of the relatively small attitude signals which is equivalent to having high attitude command signals in the forward direction on the line 61. The rapid integration thus pushes the nose down still further and a dive can ensue very quickly. In some cases, the effect can be noncompensable. The lag amplifier 126 delays the rate signal sufficiently so that the initially high rate contribution, which can be greater than the attitude contribution, is reduced, but the relatively lower rate as the attitude settles, is sufficient to inhibit the positive attitude from inducing high demand as described hereinbefore.

The AND circuit 113 normally reponds to an airspeed greater than 60 knots signal on the line 87 (when present) to provide the signal on the line 94, and when the airspeed greater than 60 knots signal is not present on the line 87, an inverter 129 will normally cause the AND circuit 114 to provide the signal on the line 97.

Figure 3:
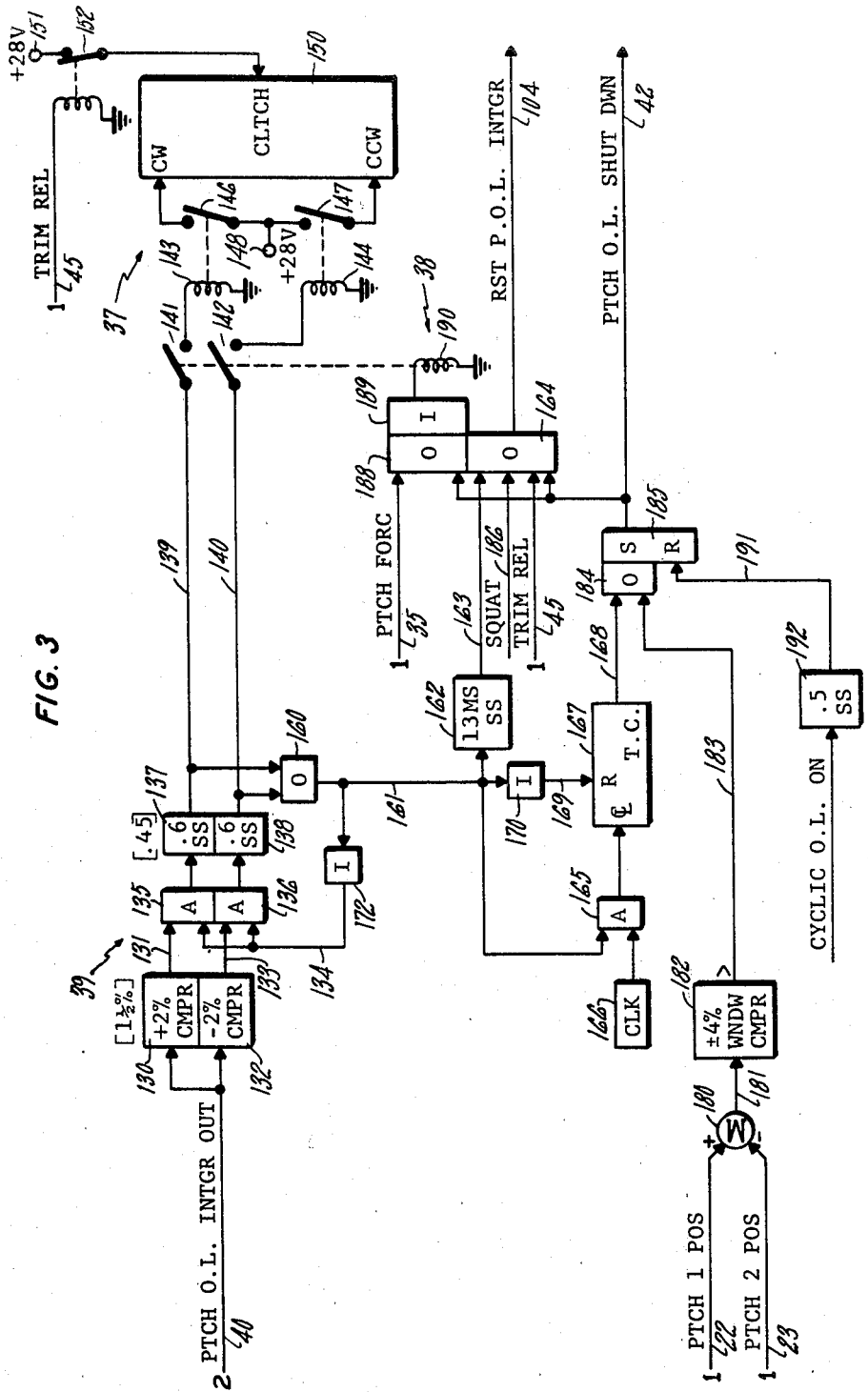
FIG. 3 is a simplified schematic block diagram of pulser, shutdown and trim actuator control circuits for use in the system of FIG. 1.

The pitch pulser 39, pitch outer loop automatic shutdown circuits 38 and pitch outer loop trim actuator 37 are illustrated in detail in FIG. 3. Whenever the summation of limited pitch attitude commands on the lines 54, 55 (FIG. 1) provided on the line 61 by the summing junction 60 are other than zero, the pitch outer loop integrator 41 will integrate those signals (assuming presence of correct control signals described with respect to FIG. 2). If the signals are consistently in the same direction (forward or aft), the pitch outer loop integrator output signal on the line 40 will eventually reach a magnitude equivalent to 2% of full pilot authority in either the forward direction or the aft direction. If in the forward direction, this will cause a comparator 130 (which includes a reference voltage equal to +2% of pilot authority) to provide a signal on a line 131. If in the aft direction, it will cause a compartor 132 (which includes a reference voltage equivalent to −2% of full pilot authority) to provide a signal on a line 133. In the normal case there is also a signal on a line 134 so that a related one of a pair of AND circuits 135, 136 will initiate a corresponding 6/10 of a second single shot 137, 138 to provide a pulse on a corresponding line 139, or 140. Assuming that a pair of normally open contacts 141, 142 are closed, a related relay coil 143, 144 will be energized. This will cause a corresponding normally open contact 146, 147 to close and apply power from a normal source 148 (such as ±28 volts) to either a clockwise or counterclockwise input of a rotary actuator 150 which can move the cyclic pitch stick 27 (FIG. 1) in either direction through the spring 29. The actuator 150 is also provided with a clutch which releases the linkage 36 (FIG. 1) from the movable armature of the actuator whenever a clutch engage input powered from a suitable source 151 is removed by opening the normally closed relay contact 152. One example of this type of rotary actuator is Model No. R4610M23-1 available from Plessey Dynamics Corp., Hillside, N.J. Of course, other rotary and linear actuators (either electrical or hydraulic, in suitable cases) may be utilized wherever any implementation of the invention warrants it.

The generation of a pulse on either of the lines 139, 140, as a consequence of the integrating in either the forward or aft direction to the extent of 2% of pilot authority, will cause an OR circuit 160 to provide a signal on a line 161 indicative of the actuator having had one step-inducing pulse applied thereto. The foremost-function of the signal on the line 161 is to activate a 13 millisecond single shot 162 to provide a pulse on a line 163 which, through an OR circuit 164 provides the reset pitch outer loop integrator signal pulse on the line 104. In FIG. 2, this activates the switch 105 and causes resetting of the pitch outer loop integrator 41. Thus, each time that the total pitch attitude command has integrated to 2% of pilot authority, the actuator 150 is stepped one increment, and the integrator 41 is reset.

In order to ensure that neither of the single shots 137, 138 get locked on in a hard-over situation, thereby to continuously drive the actuator 150 and push the cyclic pitch stick in one direction or the other continuously, a one second alarm timer is provided. This includes, in the sample herein, an AND circuit 165 responsive to each pulse on line 161 to pass signals from a clock circuit 166 to a resettable counter 167 at a rate such that it will reach a terminal count and provide a signal on a line 168 in about one second, unless a signal is applied to its reset input on a line 169 by an inverter 170 in response to the signal on the line 161 (indicating absence of both of the pulses on lines 139 or 140) prior to reaching its terminal count. Because leading edge detecting single shots 137, 138 are utilized, it is possible that the rate of integration could be sufficiently fast so as to provide an output from one of the comparators 130, 132 a second time within 6/10 of a second of a first time of providing such an output. Thus one of the AND circuits 135, 136 could provide a voltage level shift into the related single shot 137, 138 during the period of time while the single shot is still timing out. In such a case, that occurrence would be lost and would not cause a corresponding second pulse on one of the lines 139, 140 so that the position of the actuator 150 would begin to lag the desired position. Since this occurrence also prevents a reset of the integrator, the trip level is not crossed again. It could cause no further pulse for some period of time (until integrator output decreased below the 2% comparator level), so that the output loop would not catch up to the inner loop as desired. To avoid this situation, the signal on the line 161 is passed through an inverter 172 so as to block the AND circuits 135, 136 during the period of time-out of either of the single shots 137, 138. Then, when the 6/10 of a second pulse ends on either of the lines 139, 140 the inverter 172 will again provide the signal on the line 134 causing one of the AND circuits 135, 136 to provide a level shift at the input of the related single shot 137, 138 and thus provide the desired pulse on one of the lines 138, 140. Thus the pulses on the lines 138, 140 may lag up to about 6/10 of a second the firing of one of the comparators 130, 132 without losing the occurrence of the pulse altogether. In an examplary embodiment of the invention, the circuitry may be arranged so that with the high demand signal present on the line 122 (FIG. 2), with a full 5% of authority (the summation of the 2½% limited pitch attitude commands on the lines 54, 55, FIG. 1) the integrator will reach the 2% of authority necessary to cause a pulse in about 0.67 second. This yields about 3.0% per second, and about 2% per pulse.

As illustrated in FIG. 1, the automatic control over pitch attitude is effected by means of the pitch inner loop actuators 12, 13 which add and subtract mixer inputs from a nominal position established by the position of the outer loop (the cyclic pitch stick 27 and the pitch outer loop actuator 37). If one of the pitch inner loop actuators 12, 13 (or the circuitry providing commands thereto) fails or has a significant gain change, the other actuator will, within the limits of the system, provide sufficient inputs to the mixer to largely offset those provided by the failed actuator. This is called an "on/on" type of system, where one actuator normally supplies only half of the input. Most pitch inner loop actuator faults will be of the type occurring either within the actuator (whether the actuator becomes open and cannot move or exhibits a hard-over condition driving to one of its stops) and, faults could occur in the closed servo loop (those portions shown to the extreme right in FIG. 1). Therefore, since the particular failure or the nature of it cannot be determined without the addition of complex diagonostic apparatus, it must be assumed that the pitch attitude signals trying to drive both actuators will reflect the fact that one of them is hard-over, so that the aircraft attitude is lagging the commands, causing large inputs to the outer loop centering system. Thus, if a failure of one of the actuators occurs, the signals feeding the outer loop centering system will cause the outer loop centering system to tend to track the failed actuator, making things even worse.

To avoid having the outer loop centering system track a failed inner loop actuator, the actuator position signals on the lines 22, 23 are subtracted in a summing junction 180 and a signal indicative of the difference between the two actuator positions is applied on a line 181 to a window comparator 182 having reference voltages therein equivalent to ±4% of full pilot authority. Therefore, should the pitch actuator positions differ by more than 4% of pilot authority, the window comparator 182 will provide a signal on a line 183 which will cause an OR circuit 184 to set a pitch outer loop shutdown bistable device 185 and thereby provide the pitch outer loop shutdown signal on the line 42. The bistable device 185 can also be set through the OR circuit 184 by the signal on the line 168 indicative of the fact that one of the six-tenths second single shots 137, 138 has failed in the ON condition.

The pitch outer loop shutdown signal on the line 42 is applied to the OR circuit 164 and therefore will cause resetting of the pitch outer loop integrator as a consequence of the signal on the line 104, in a manner described with respect to FIG. 2 hereinbefore. The OR circuit 164 will also cause resetting of the pitch outer loop integrator whenever the aircraft is on the ground, as indicated by a squat signal on a line 186, and whenever trim release is depressed, as indicated by the signal on the line 45.

The pitch outer loop shutdown signal on the line 42 is also applied to an OR circuit 188, along with the pitch force signal on the line 35, to cause an inverter 189 to cease to provide current to a relay coil 190, thereby causing the contacts 141, 142 to open, so that any pulses on the line 139, 140 will be foreshortened at the actuator 37, and no further pulses can be applied. Of course, with the pitch outer loop integrator in the continuously reset state as a consequence of the signal on the line 104, which is also caused by the pitch outer loop shutdown signal 42, there could be no further pulses generated on the lines 139, 140 during pitch outer loop shutdown. And, whenever the contacts 141, 142 are opened as a consequence of the pitch force signal on the line 35, the pitch outer loop integrator input is open as a consequence of the inverter 111 (FIG. 2) as described hereinbefore. The pitch outer loop shutdown bistable device 185 is reset by a half-second pulse on a line 191 from a single shot 192 whenever the cyclic pitch outer loop function is turned on, which normally will include both the longitudinal cyclic pitch (pitch) and lateral cyclic pitch (roll) outer loop channels.

Figure 4:
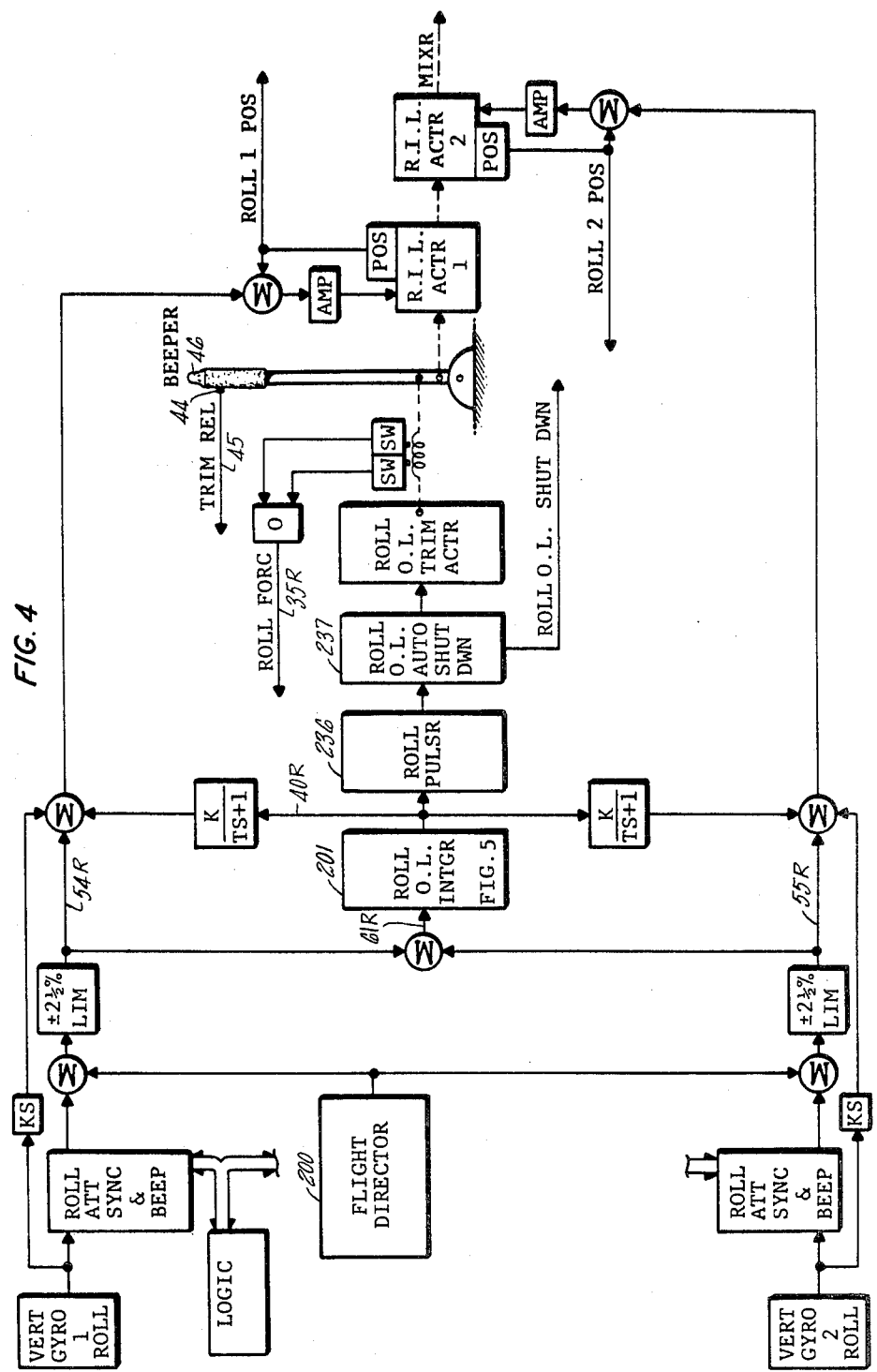
FIG. 4 is a simplified schematic block diagram of a lateral cyclic pitch channel of an aircraft automatic flight control system in which the present invention may be implemented.

An examplary roll system employing automatic outer loop centering of inner loop controls is illustrated briefly in FIG. 4. This system is essentially identical to the pitch system described with respect to FIG. 1 hereinbefore, except for the absence of airspeed controls 84 (FIG. 1). The roll channel may have a flight director 200 (or other automatic roll steering director). In FIG. 4, the signal lines specifically referred to in the description of a roll outer loop integrator 201 with respect to FIG. 5, hereinafter, retain the same reference numerals as the corresponding pitch channel lines of FIG. 1, but with the suffix "R".

Figure 5:
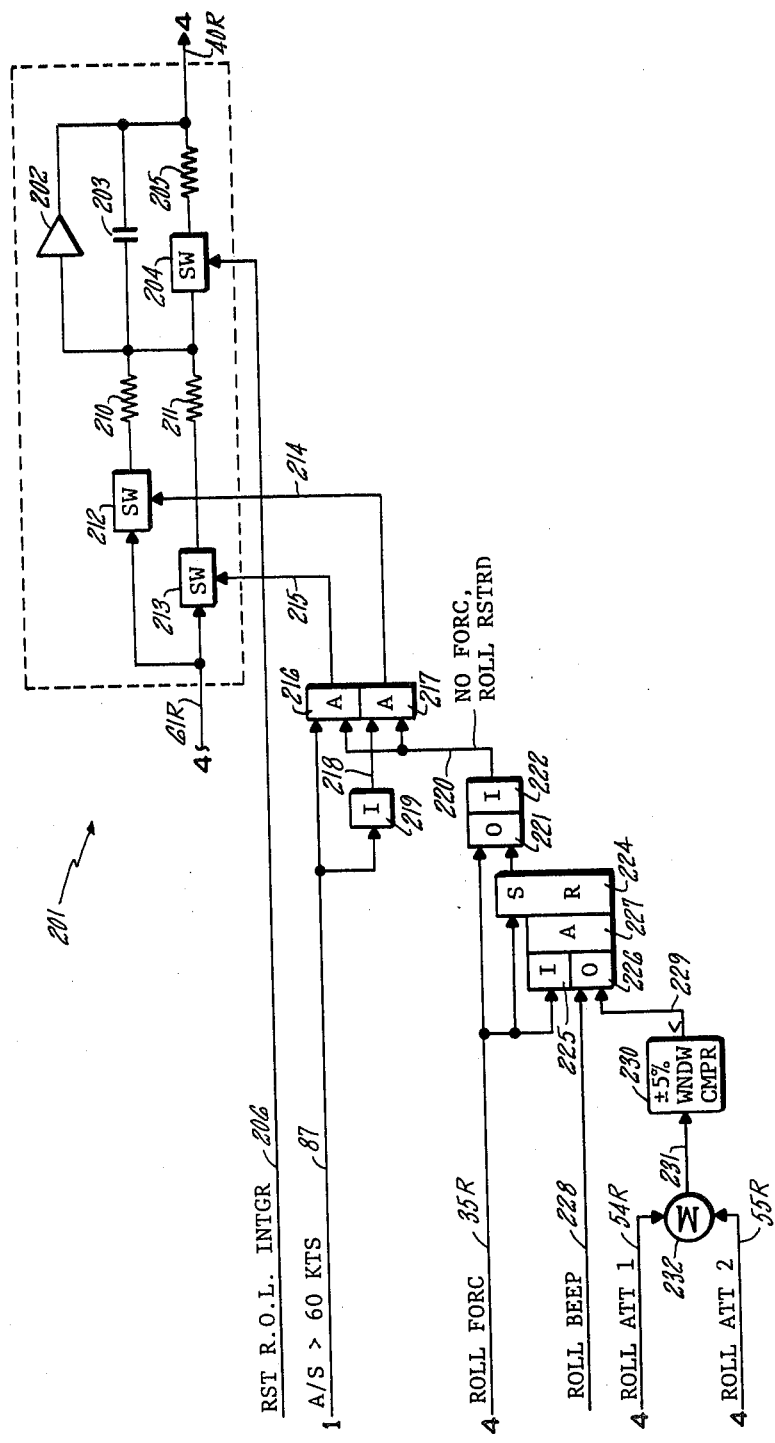
FIG. 5 is a simplified schematic block diagram of a roll outer loop integrator and controlling circuits therefor, for use in the system of FIG. 4.

In FIG. 5, the roll outer loop integrator 201 includes an amplifier 202 having a feedback capacitor 203 which may be reset by closure of a switch 204 to discharge the capacitor 203 through a resistor 205. The switch 204 is closed by the presence of a reset roll outer loop integrator signal on a line 206, which signal is generated in a commensurate fashion to the generation of the reset pitch outer loop integrator signal on the line 104, as described hereinbefore. The gain, and therefore the equivalent time constant for integration of the roll outer loop integrator 201 may be adjusted by selecting the desired input resistor 210, 211 by means of related switches 212, 213 which are activated by signals on lines 214, 215 from AND circuits 216, 217, respectively, operable when airspeed is above 60 knots as indicated by a signal on the line 87, or when it is below 60 knots as indicated by a signal on a line 218 provided by an inverter 219. Thus a slight change in integrating rate as a function of airspeed is provided in the roll outer loop integrator 201 in a fashion similar to that provided in the pitch outer loop integrator 41, as described hereinbefore. Both of the AND circuits 216, 217 can be blocked by the absence of a signal on a line 220, which signal is normally indicative of the absence of pilot stick force in the roll direction. Whenever the pilot does apply lateral force on the cyclic pitch stick 27, the roll force signal on the line 35R causes an OR circuit 221 to provide an input to an inverter 222 that causes the signal on the line 220 to go low. Therefore, the input to the roll outer loop integrator 201 becomes open. The signal on the line 35R also sets a bistable device 224 so that even after the lateral force on the cyclic pitch stick is removed, and the signal on the line 35R disappears, the set side of the bistable device 224 will pass a signal through the OR circuit 221 to maintain operation of the inverter 222, which causes the input of the roll outer loop integrator 201 to continue to be open. Therefore, even though force is removed, so that the roll outer loop trim actuator is connected to the pulsers (equivalent to the contacts 141, 142 in FIG. 3) there can be no change in the integrator so long as the bistable 224 is set. Because of an inverter 225, the bistable device 224 cannot be reset so long as force is applied. But once the roll force signal on the line 35R disappears, then the operation of an OR circuit 226 will cause an AND circuit 227 to apply a signal to the reset side of the bistable device 224 and cause it to reset. The OR circuit 226 is responsive to either a roll beep signal on a line 228; which is provided in a straightforward way by sensing closure of either of the lateral switches in the beeper 46 (FIG. 4). The OR circuit 226 can also be operated by a signal on a line 229 from a window comparator 230 having reference voltages therein equal to plus and minus 5% of pilot authority. The window comparator 230 in turn responds to a signal on a line 231 which represents the total roll attitude command as indicated by signals on the lines 54R, 55R provided to a summing junction 232. Thus, once the pilot applies lateral force to cyclic pitch stick, the outer loop will no longer recenter the roll input to the mixer until the stick is released and either the aircraft returns to nearly its reference roll attitude position (as indicated by low roll attitude input commands), so the inner loop is no longer saturated and can again be trimmed by the outer loop. But, if the pilot beeps the system in roll, the outer loop is restored to recenter the inner loop at the new reference.

Referring again to FIG. 4, the roll pulser circuits 236 are the same as the pitch pulser circuits 39 described in FIG. 3 except they may have a 1½% comparators 130, 132 and the length of the pulse might be reduced to 0.45 second in the single shots 137, 138, resulting in 1½% trim correction per pulse. Roll outer loop shutdown circuits 237 could be essentially the same as the pitch outer loop automatic shutdown circuits 38 as illustrated in FIG. 3 except for commensurate coversion to roll-related signals in place of specifically pitch-related signals. And, the remaining roll outer loop actuator apparatus may be substantially identical to that described with respect to the pitch channel in FIGS. 1-3 hereinbefore.

In the exemplary embodiment of the invention disclosed herein, the OR circuit 184 causes pitch outer loop automatic shut down by setting the bistable device 185 (which acts as a register of the shut down condition) whenever the position of one of the pitch inner loop actuators 12, 13 deviates from that of the other by more than 4% of full authority (which is 40% of the authority of the combined actuators together). However, this may be adjusted to suit the requirements of any implementation of the present invention. Additional monitoring could be provided as desired, such as comparing the rate of change of position of the two actuators. However, in such a case care must be taken to sense the condition when one actuator is permissibly at its stop and the other one is simply approaching its stop.

The foregoing description is in simplified block form, the detailed circuitry being described with respect to simple positive logic utilizing either relay contacts or switches to open and close certain paths, summing junctions (which are understood to be combinations of resistors at the correct inverting and noninverting inputs of suitable amplifiers) single shots which may require reset dominance or may not need one, bistable devices, and the like. Many of the foregoing functions can obviously be achieved in a simpler fashion by using more true and complement outputs and fewer inverters; in many instances the positive logic disclosed may readily be reworked into inverting logic to be more suitably applicable to available hardware chips. The description is, therefore, principally in terms of function achieving blocks, and it should be understood that numerous variations may be utilized for achieving the same or equivalent functions and combinations of functions within the skill of the art. In addition, the functions of the foregoing apparatus (other than the mechanical functions and those functions which directly interface with the mechanical functions) may readily be implemented by utilization of a suitably programmed digital computer. The conversion of the discrete and analog functions described herein to digital functions performed by suitable software in a computer is well within the skill of the art, particularly in the light of the teachings of equivalency set forth in a commonly owned copending U.S. patent application, Ser. No. 176,832, filed on Aug. 8, 1980 by Clelford et al.

The invention may be practiced in automatic flight control systems having single channels of inner loop or of outer loop, dual channels of inner loop or of outer loop, or more channels of either, in various combinations. The exemplary conditions, magnitudes, durations and relationships may of course be varied to suit any usage of the invention. Aspects of the invention may be practiced in automatic control of various functions, in addition to the illustrative functions described herein.

Similarly, although the invention has been shown and described with respect to an exemplary embodiment thereof, it should be understood by those skilled in the art that the foregoing and various other changes, omissions and additions may be made therein and thereto, without departing from the spirit and the scope of the invention.

We claim:

1. A system for automatically positioning aerodynamic surfaces in a control axis of an aircraft, comprising:
    a sensor indicative of a parameter of aircraft flight related to said control axis for providing a parameter signal indicative of the magnitude thereof;
    a pair of fast, inner loop actuators serially connected for changing the position of said aerodynamic surfaces across a limited authority range of positions which is a fraction of the total permissible range of positions thereof;
    a position detector for each of said inner loop actuators, each providing a signal indicative of the position of the corresponding actuator;
    an outer loop actuator connected to said inner loop actuators for adjusting the position of said inner loop actuators relative to the position of said control surfaces throughout a full authority range of positions equal to the total permissible range of positions thereof, to thereby reposition the center of said limited authority range relative to said full authority range; and
    signal processing means, connected for response to said sensor, for providing a reference signal indicative of a desired magnitude of said parameter, for providing a proportional command signal indicative of the magnitude and sense of the difference between said parameter signal and said reference signal to adjust the position of said inner loop actuators and therefore of said control surfaces in a first direction, depending on the sense of said difference, to cause said parameter signal to approach equality with said reference signal, for providing, to said each of inner loop actuators, a rate command signal indicative of the magnitude and sense of the rate of change of said parameter signal to adjust the position of said conrol surfaces in a second direction, depending on the sense of said rate of change, to cause the rate of change of said parameter signal to approach nil, and for providing said proportional command signal to said inner loop actuators and to said outer loop actuator;
    characterized by said signal processing means comprising means for providing a shut down signal in response to the difference between said position signals being in excess of a predetermined magnitude, and for inhibiting provision of said proportional command signal to said outer loop actuator in response to said shut down signal.

2. A system according to claim 1 characterized by said predetermined magnitude corresponding to position adjustments on the order of a few percent of said full authority range.

* * * * *